United States Patent [19]

Seino

[11] Patent Number: 4,695,597

[45] Date of Patent: Sep. 22, 1987

[54] ORGANOPOLYSILOXANE COMPOSITION FOR FIRE-RESISTANT FOAMED SILICONE RUBBER

[75] Inventor: Masanori Seino, Gunma, Japan

[73] Assignee: Shin-Etsu Chemical Co., Ltd., Tokyo, Japan

[21] Appl. No.: 898,132

[22] Filed: Aug. 19, 1986

[30] Foreign Application Priority Data

Aug. 20, 1985 [JP] Japan ................................ 60-182739

[51] Int. Cl.$^4$ ............................................. C08G 77/00
[52] U.S. Cl. ..................................... 521/154; 521/92;
521/907; 528/15; 528/31; 528/32; 524/861;
524/862
[58] Field of Search ......................... 521/92, 154, 907;
528/15, 31, 32; 524/861, 862

[56] References Cited

U.S. PATENT DOCUMENTS 3,923,705 12/1975 Smith .................................. 521/154
4,189,545 2/1980 Modic ................................. 521/154

Primary Examiner—Melvyn I. Marquis
Attorney, Agent, or Firm—Jules E. Goldberg

[57] ABSTRACT

The inventive foamable silicone rubber composition comprises (a) a silanolic hydroxy-terminated diorganopolysiloxane, (b) a vinylsilyl-terminated diorganopolysiloxane, (c) an organohydrogenpolysiloxane as a crosslinking agent of the diorganopolysiloxanes, (d) a filler, (e) a platinum compound as a catalyst, (f) aluminum hydroxide and (g) red phosphorus. The components (f) and (g) each serve as a fire-resistance improver to synergistically impart the cured foamed silicone rubber with greatly improved resistance against fire when it is exposed to flame.

9 Claims, No Drawings

ORGANOPOLYSILOXANE COMPOSITION FOR FIRE-RESISTANT FOAMED SILICONE RUBBER

BACKGROUND OF THE INVENTION

The present invention relates to an organopolysiloxane composition for fire-resistant foamed silicone rubber and a foamed silicone rubber body formed therefrom or, more particularly, to a foamable organopolysiloxane composition capable of giving a foamed silicone rubber body which can withstand a high-temperature flame in prolonged exposure retaining rubbery elasticity without consolidation or formation of cracks without losing usefulness as a filling material of throughgoing holes, for example, in buildings.

Several methods are known and practiced for the preparation of foamed bodies of a silicone rubber including the methods in which the foaming composition should be admixed with a blowing agent due to the absence of any foaming power in the organopolysiloxane composition per se and the methods in which the gaseous product produced in the condensation reaction for crosslink formation of the organopolysiloxane ingredient is utilized as the blowing agent to form a cellular foamed structure.

A typical method belonging to the former class is disclosed, for example, in Japanese Patent Publication No. 45-12675 according to which a foamed silicone rubber body is prepared by the decomposition gas of a heat-decomposable blowing agent admixed with an organopolysiloxane composition composed of a vinyl-containing organopolysiloxane having at least two silicon-bonded vinyl groups in a molecule and an organohydrogenpolysiloxane having at least three silicon-bonded hydrogen atoms in a molecule together with a platinum catalyst which promotes the addition reaction to form crosslinks between the vinyl-containing organopolysiloxane and the organohydrogenpolysiloxane. This method is not quite advantageous in the industrial production because the composition must be heated to effect the thermal decomposition of the blowing agent and expansion of the silicone rubber body is rather limited not to give a cellular foamed body of silicone rubber having a very low bulk density. On the other hand, a method belonging to the latter class is disclosed in Japanese Patent Publication No. 44-8875 according to which a hydroxy-containing organopolysiloxane having silicon-bonded hydroxy groups and an organohydrogenpolysiloxane having silicon-bonded hydrogen atoms are reacted in the presence of an organic acid salt of heavy metals or a quaternary ammonium salt as the catalyst. A problem in this method is caused by the presence of such a catalytic compound of ionic nature in the composition which may be subject to depolymerization of the siloxane linkages when the composition or foamed silicone rubber body thereof is brought into contact with water or steam at high temperatures to lose the characteristic properties as a rubber.

The above mentioned disadvantages caused by the ionic compound contained in the composition as the catalyst can be solved when the catalyst for the condensation reaction of a hydroxy-containing organopolysiloxane and an organohydrogenpolysiloxane is replaced with a rhodium compound as is taught in Japanese Patent Publication No. 53-48224 or with a platinum compound as is taught in Japanese Patent Kokai No. 51-46352 and Japanese Patent Publications No. 52-42865 and No. 53-48225. The foamed silicone rubber bodies obtained by these improved methods are known to have an additional advantage of flame retardancy.

On the other hand, demand for such foamed silicone rubbers is rapidly growing in the field of building construction industries. Needless to say, a trend in the modern building technology is toward increasing numbers of multistoried high buildings as well as toward compliance with increasing requirements for safety design, especially, against fires. In this regard of safety against fires in buildings in general, it is indispensable or rather imperative that any opening in buildings must be provided with a fire-resistant, air-tight sealing means. Conventional sealing materials based on inorganic fibrous or putty-like substances are not quite satisfactory for such an application in respect of the resistance against fire and air-tightness. Accordingly, the above described foamed silicone rubbers formulated with a rhodium or platinum catalyst are sometimes used as a sealing material of buildings by virtue of their excellent resistance against fire and capacity of giving air-tightness to the seal. These improved foamed silicone rubbers are still not without problems as a fire-resistant sealing material since prolonged exposure of the foamed silicone rubber to flames causes decomposition and combustion of the silicone ingredients therein to convert the foamed body into a glassy clinker-like body of silicon dioxide or ashed body in which many cracks are necessarily formed through which the fire may further spread to increase the danger to human life and loss property by fire.

Accordingly, a further improvement has been proposed in Japanese Patent Kokai No. 57-141476 to increase the fire resistance of foamed silicone rubbers of this type by admixing the foaming organopolysiloxane composition with a phosphoric acid ester, hydrated inorganic compound capable of being endothermically dehydrated at a temperature of 60° to 500° C. and an inorganic fibrous material. A problem in this improved formulation is that the phosphoric acid ester may sometimes act as a catalyst poison against the platinum catalyst to cause incomplete curing of the silicone rubber. In addition, such a foamed rubber produces, when it is exposed to flames of speading fire, a large volume of smoke sometimes to cause fatal danger by the loss of view sight in escape from fire or in fireman works.

SUMMARY OF THE INVENTION

The present invention therefore has an object to provide a novel organopolysiloxane composition capable of giving a foamed silicone rubber body free from the described problems and disadvantages in the foamed silicone rubbers of prior art.

The inventive organopolysiloxane composition for foamed silicone rubber comprises: (a) 100 parts by weight of a first diorganopolysiloxane having a hydroxy group bonded to the silicon atom at each of the molecular chain ends and represented by the general formula $$HO-SiR_2-O-SiR_2-O_m SiR_2-OH, \qquad (I)$$

in which R is a monovalent hydrocarbon group free from aliphatic unsaturation and m is a positive integer in the range from 5 to 10,000;

(b) from 10 to 100 parts by weight of a second diorganopolysiloxane having a vinyl group bonded to the silicon atom at each of the molecular chain ends and represented by the general formula $$CH_2=CH-SiR_2-O-SiR_2-O_n SiR_2-CH=CH_2, \qquad (II)$$

in which R has the same meaning as defined above and n is a positive integer in the range from 10 to 1000;

(c) an organohydrogenpolysiloxane having, in a molecule, at least two hydrogen atoms directly bonded to the silicon atoms in such an amount that from 2.0 to 40.0 moles of the silicon-bonded hydrogen atoms are provided per mole of the overall amount of the hydroxy groups in the first diorganopolysiloxane and the vinyl groups in the second diorganopolysiloxane;

(d) from 5 to 100 parts by weight of an inorganic filler;

(e) a platinum compound in a catalytic amount;

(f) from 5 to 100 parts by weight of aluminum hydroxide; and (g) from 0.1 to 5 parts by weight of red phosphorus.

DETAILED DESCRIPTION OF THE PREFERRED EMBODIMENTS

As is described in the above given summary, the inventive organopolysiloxane composition comprises seven kinds of essential components (a) to (g), of which the first three are the organopolysiloxane constituents and the crosslinking reaction may readily take place therein in the presence of the platinum catalyst producing hydrogen gas which serves as a blowing agent to give a foamed silicone rubber. When the composition is compounded with aluminum hydroxide and red phosphorus in combination, the aluminum hydroxide having a relatively low decomposition temperature is first decomposed when the foamed silicone rubber is exposed to flame and liberate water which serves as a diluent of the combustible gas and simultaneously as a coolant of the ambience around the foamed silicone rubber on fire. Further, the red phosphorus is combined with the carbonized material formed in the flame to give a protecting film on the surface of the foamed silicone rubber body to block heat and oxygen from contacting with the burning foamed silicone rubber body to retard combustion thereof so that the foamed silicone rubber body can retain the rubbery elasticity without consolidation or formation of cracks.

The component (a) is a silanolic hydroxy-terminated diorganopolysiloxane represented by the general formula (I) given above, in which the symbol R denotes a monovalent hydrocarbon group free from aliphatic unsaturation exemplified by alkyl groups, e.g. methyl, ethyl, propyl and butyl groups, aryl groups, e.g. phenyl and tolyl groups, and cycloalkyl groups, e.g. cyclohexyl group, as well as those substituted hydrocarbon groups obtained by replacing a part or all of the hydrogen atoms in the above named hydrocarbon groups with substituent atoms and/or groups such as halogen atoms, cyano groups and the like including chloromethyl, 3,3,3-trifluoropropyl and cyanomethyl groups. It is optional that the diorganopolysiloxane has one or more kinds of these substituted or unsubstituted monovalent hydrocarbon groups in a molecule. Particularly preferable as the group R are methyl, ethyl and phenyl groups and, more preferably, at least 50 % by moles or substantially all of the groups denoted by R in a molecule should be methyl groups. The subscript m in the general formula (I) is a positive integer in the range from 5 to 10,000.

The component (b) in the inventive composition is a vinyl-terminated diorganopolysilxoane represented by the general formula (II) given above, in which the groups denoted by R may be selected from the same substituted or unsubstituted monovalent hydrocarbon groups as shown above as the examples of the group R in the first diorganopolysiloxane. Preferably, the groups denoted by R in this second diorganopolysiloxane should be selected from the class consisting of methyl, ethyl, phenyl and 3,3,3-trifluoropropyl groups or, more preferably, from methyl and phenyl groups so that the diorganosiloxane units of which the diorganopolysiloxane is composed excepting the terminal siloxy groups include dimetylsiloxane units, diphenylsiloxane units and methyl phenyl siloxane units. The terminal siloxy group can be a vinyl dimethylsiloxy group, vinyl methyl phenyl siloxy group and the like. The subscript n in the general formula (II) is a positive integer in the range from 10 to 1000. The amount of the second diorganopolysiloxane in the inventive composition should be in the range from 10 to 100 parts by weight per 100 parts by weight of the first diorganopolysiloxane. When the amount of the component (b) is too small, no sufficient effect of reinforcement can be obtained while an excessively large amount thereof may result a cured foamed silicone rubber body having a hardness higher than adequate.

The component (c) is an organohydrogenpolysiloxane having, in a molecule, at least two or, preferably, at least three hydrogen atoms directly bonded to the silicon atoms and serves as a crosslinking agent of the diorganopolysiloxanes as the components (a) and (b). The above mentioned active hydrogen atoms may be bonded to the silicon atoms at any position in the molecule of the organohydrogenpolysiloxane which may have a straightly linear, branched chain-like or cyclic molecular structure. The degree of polymerization, i.e. the number of silicon atoms in a molecule, of the organohydrogenpolysiloxane is not particularly limitative but preferably should be in the range from 2 to 500 in view of the easiness in the synthetic preparation thereof. The organic groups bonded to the silicon atoms thereof should preferably be monovalent hydrocarbon groups free from aliphatic unsaturation and typically they are methyl groups though not particularly limited thereto.

Typical organohydrogenpolysiloxanes suitable as the component (c) include those expressed by the following structural formulas denoting a methyl group with Me:

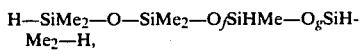

in which f and g are each zero or a positive integer;

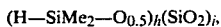

in which h and i are each a positive integer.

The amount of the organohydrogenpolysiloxane in the inventive composition should be adequately selected relative to the overall amount of the silanolic hydroxy groups in the first diorganopolysiloxane and the silicon-bonded vinyl groups in the second diorganopolysiloxane. Namely, the amount of the component (c) should be sufficient to provide from 2.0 to 40.0 moles of the silicon-bonded hydrogen atoms per mole of the overall amount of the silanolic hydroxy and silicon-bonded vinyl groups in the components (a) and (b). When the amount of the component (c) is too small, high expansion of the silicone rubber by foaming can hardly be obtained while a too much amount thereof may result in a foamed silicone rubber body having poor mechanical strengths.

The component (d) is a filler which may be any of known ones conventionally used in silicone rubbers including finely divided fumed and precipitated silica flours, finely pulverized quartz powder, glass fibers, asbestos, carbon black, iron oxide, titanium dioxide, zinc oxide, calcium carbonate, magnesium carbonate and the like. The filler should be dried as completely as possible prior to compounding with the other components since the moisture contained in the filler can be an inhibitive factor of the curing reaction. The moisture content in the filler should be 3% by weight or smaller before compounding. The amount of the filler in the inventive composition is not particularly limitative and can be adequately selected depending on the particularly intended application of the foamed silicone rubber although the amount should usually be in the range from 5 to 100 parts by weight per 100 parts by weight of the first diorganopolysiloxane as the component (a).

The component (e) is a platinum compound which serves as a catalyst for the crosslink formation taking place between the organopolysiloxane constituents of the components (a) to (c) by the so-called hydrosilation. Various kinds of platinum compounds can be used as the catalyst although the compound should be miscible with the organopolysiloxane constituents and the most typical one is chloroplatinic acid or a modification or complex thereof such as the alcohol-modified chloroplatinic acid disclosed in U.S. Pat. No. 3,220,972, complexes of chloroplatinic acid with an olefin disclosed in U.S. Pat. Nos. 3,159,601, No. 3,159,662 and No. 3,775,452 and others. Chloroplatinic acid per se or an olefin complex thereof should be used in the form of a solution in an organic solvent such as alcohols, ketones, ethers, hydrocarbons and the like. The amount of the platinum compound in the inventive composition is a so-called catalytic amount without particular limitations depending on the desired velocity of curing but should preferably be in the range from 1 to 200 ppm by weight as platinum based on the overall amount of the organopolysiloxane constituents, i.e. the components (a), (b) and (c), in view of the balance between the cost due to the expensiveness of the platinum compound and the curing behavior of the inventive composition.

In combination with the above described platinum compound, the inventive composition may optionally be admixed with a known moderator of the catalytic activity in order to adequately control the velocity of foaming by the platinumcatalyzed reaction between the organopolysiloxane constituents. Suitable moderator compounds include so-called acetylene alcohols such as 3-methyl-1-pentyn-3-ol, 3-methyl-1-butyn-3-ol and the like and cyclic compound of polymethylsiloxane obtained by the hydrolysis of methyl vinyl dichlorosilane.

The component (f) in the inventive composition is aluminum hyroxide which acts as a flame retardant. Various grades of commercially available products of aluminum hydroxide can be used as such without particular limitations. The amount thereof in the inventive composition should be in the range from 5 to 100 parts by weight per 100 parts by weight of the first diorganopolysiloxane as the component (a). When the amount thereof is too small, the effect of flame retardancy cannot be fully exhibited as a matter of course while, on the other hand, an excessively large amount thereof may be detrimental on the mechanicl strength of the resultant foamed silicone rubber body.

The component (g) in the inventive composition is red phosphorus which acts as a flame retardant agent synergistically with aluminum hydroxide. Many commercial products of red phosphorus are available in a finely pulverized form and can be used as such without particular limitations. The amount of the red phosphorus in the inventive composition should be in the range from 0.1 to 5 parts by weight per 100 parts by weight of the first diorganopolysiloxane as the component (a). When the amount thereof is too small, the effect of flame retardancy cannot be fully exhibited as a matter of course while, on the other hand, an excessively large amount thereof is detrimental in respect of the inhibitive effect on the curing reaction of the organopolysiloxane constituents.

The foamable organopolysiloxane composition of the invention can be prepared by uniformly blending the above described components (a) to (g) each in a calculated and weighed amount together with other optional ingredients. It should be noted here that, when the organohydrogenpolysiloxane as the component (c) and the platinum compound as the component (e) are brought into contact in a composition, the dehydrogenation reaction of the former compound may immediately be started even at room temperature so that the activity of the organohydrogenpolysiloxane as the crosslinking agent may be decreased. When the component (a) or (b) is combined with the organohydrogenpolysiloxane as the component (c) in the presence of the platinum compound as the catalyst, the crosslinking reactions by the dehydrogenation to form siloxane linkages and the hydrosilation to form silethylene linkages may proceed prematurely even at room temperature. This situation means that the inventive composition should be completed by mixing all of the components together only directly before the composition is shaped into a form which is subjected to concurrent foaming and curing into a desired foamed silicone rubber body.

Accordingly, it is a usual way that the composition is stored and supplied in two packages each containing different component or components from the other and the contents of these two packages are rapidly blended together to give a completed foamable composition directly before use. In view of the convenience and efficiency in the blending work, the base blends in the two packages should preferably have about the same density and consistency. A convenient way to give such a two-package formulation is that the content of the first package is formulated with the components (a) (d), (e), (f) and (g) while the content of the second package is formulated with the components (b), (c), (d), (f) and (g).

In the following, the foamable organopolysiloxane composition of the invention is illustrated in more detail by way of examples, in which the expression of "parts" refers to "parts by weight" in each occurrence. The compositions prepared in the Examples and Comparative Examples were evaluated by the following testing methods for the fire-resistance, smoke emission by burning and stability in storage.

Testing Method of Fire Resistance

Propane gas was burnt in a Bunsen burner with oxygen as the combustion-supporting gas in such a controlled manner that the height of the blue flame was about 25 mm and the test specimen was contacted to the upper end of the blue flame for 60 seconds to be ignited followed by removal of the burner away from the test specimen. Measurement was made of the length of time in seconds from the moment when the burner was removed and to the moment when the flame on the test specimen spontaneously went out. The time was recorded as the self-extinguishment time. Further, the test specimen after this burning test was examined for the condition of the surface exposed to the flame, formation of cracks and depth of the carbonized layer.

Method for The Measurement of Smoke Emission

The method was about the same as specified in JIS D 1201 and the emission of the smoke was given by the decrease of the intensity of light after passing through the atmosphere filled with the smoke when the test specimen was burnt in an atmosphere of a 68:32 by volume mixture of nitrogen and oxygen.

Testing Method of Storage Stability

A composition was prepared from all of the components (a) to (g) excepting the component (c), i.e. the organohydrogenpolysiloxane, and, after standing at 20° C. for days, the composition was admixed with the component (c) to give a completed foamable composition which was examined for the curing behavior and the time in minutes taken for complete curing was recorded as a measure of the inhibitive effect of the ingredients on the catalytic activity of the platinum compound.

Examples 1 to 3 and Comparative Examples 1 to 4

In each of Examples 1 to 3, 92 parts of a first dimethylpolysiloxane having an average degree of polymerization of about 600 and terminated at both molecular chain ends each with a dimethyl hydroxy silyl group, 8 parts of a second dimethylpolysiloxane having an average degree of polymerization of about 10 and terminated at both molecular chain ends each with a dimethyl hydroxy silyl group, 26 parts of a third dimethylpolysiloxane having an average degree of polymerization of about 100 and terminated at both molecular chain ends each with a dimethyl vinyl silyl group, 8 parts of a methyl hydrogen polysiloxane having an average degree of polymerization of about 40 containing 1.56 moles of hydrogen atoms directly bonded to the silicon atoms per 100 g and terminated at both molecular chain ends each with a trimethylsilyl group, 0.2 parts of a chloroplatinic acid-divinyl tetramethyl disiloxane complex containing about 1% by weight of platinum, 0.2 part of 1,3,5,7-tetramethyl-1,3,5,7-tetravinyl cyclotetrasiloxane, 30 parts of a finely pulverized quartz powder having an average particle diameter of about 2 $\mu$m, 0.3 part of carbon black, a varied amount of aluminum hydroxide and a varied amount of red phosphorus were blended together rapidly at room temperature to give a foamable silicone rubber composition A, B or C, respectively. The molar ratio of the silicon-bonded hydrogen atoms to the total of the silanolic hydroxy and silicon-bonded vinyl groups was 3.5 in each of these compositions. The composition immediately started expansion by foaming and a cured body of high expansion was obtained after 5 minutes. A block of 30 cm by 30 cm by 5 cm dimensions was taken by cutting this foamed silicone rubber body and subjected to the tests for evaluation. Table 1 below shows the amounts of the aluminum hydroxide and red phosphorus and the % expansion in each of Examples 1 to 3.

In each of Comparative Examples 1 to 4, preparation of the foamable silicone rubber composition D, E, F or G, respectively, and a test block of foamed silicone rubber therefrom was performed in the same manner as described above excepting omission of either one or both of aluminum hydroxide and red phosphorus as indicated in Table 1. The composition in Comparative Example 4 was further admixed with 11.9 parts of tricresyl phosphate and 0.5 part of asbestos.

The test blocks prepared from the compositions A to G were subjected to the fire-resistance test by exposure to flame and the measurement of the smoke emission to give the results shown in Table 1.

Further, compositions A-1 to G-1 were prepared each in the same formulation as in the preparation of the foamable compositions A to G, respectively, excepting the omission of the methyl hydrogen polysiloxane. After storage for 1, 3 or 7 days at 20° C., each of the compositions A-1 to G-1 was admixed with the same methyl hydrogen polysiloxane in the same amount as in the preparation of the compositions A to G and subjected to the test of the time taken for complete curing. The results are shown in Table 1.

TABLE 1

|  |  | Example | | | Comparative Example | | | |
|---|---|---|---|---|---|---|---|---|
|  |  | 1 | 2 | 3 | 1 | 2 | 3 | 4 |
| Aluminum hydroxide, parts | | 15 | 10 | 30 | — | — | 15 | 15 |
| Red phosphrus, parts | | 1 | 0.5 | 3 | — | 1 | — | — |
| % expansion | | 350 | 370 | 340 | 370 | 370 | 350 | 360 |
| Self-extinguishment time, seconds | | 8 | 13 | 10 | 22 | 18 | 15 | 13 |
| After exposure to flame | Surface condition | *a | *a | *a | *b | *a | *b | *a |
| | Cracks | no | no | no | yes | no | yes | no |
| | Carbonized layer, mm | 5 | 8 | 6 | 15 | 10 | 14 | 7 |
| Smoke emission, % | | 68 | 60 | 70 | 11 | 65 | 16 | 92 |
| Curing time after storage, minutes | Initial | 2 | 2 | 2 | 2 | 2 | 2 | 4 |
| | After 1 day | 2 | 2 | 2 | 2 | 2 | 2 | 5 |
| | After 3 days | 2 | 2 | 2 | 2 | 2 | 2 | 5 |
| | After 7 days | 3 | 2 | 3 | 2 | 3 | 2 | 12 |

*a: rubbery elasticity retained
*b: glassy without elasticity

EXAMPLE 4.

A foamable silicone rubber composition was prepared by uniformly and rapidly blending 92 parts of a dimethylpolysiloxane having an average degree of polymerization of about 500 and terminated at both molecular chain ends each with a dimethyl hydroxy silyl group, 8 parts of another dimethylpolysiloxane having an average degree of polymerization of about 10 and terminated at both molecular chain ends each with a dimethyl hydroxy silyl group, 25 parts of an diorganopolysiloxane having an average degree of polymerization of about 100 and composed of 68% by moles of dimethylsiloxane units, 30% by moles of diphenylsiloxane units and 2% by moles of dimethyl vinyl siloxy units at the molecular chain ends, 8 parts of a methyl hydrogen polysiloxane having an average degree of polymerization of about 10 containing 1.25 moles/100 g of the silicon-bonded hydrogen atoms and terminated at both molecular chain ends each with a trimethyl silyl group, 0.2 part of an octyl alcohol solution of chloroplatinic acid containing about 2% by weight of platinum, 25 parts of a finely pulverized quartz powder having an average particle diameter of about 2 μm 0.3 part of carbon black, 15 parts of aluminum hydroxide and 1 part of red phosphorus. The molar ratio of the silicon-bonded hydrogen atoms to the total of the silanolic hydroxy and silicon-bonded vinyl groups was 2.8. After 5 minutes from blending, the composition was converted into a cured foamed silicone rubber body of 330% expansion, from which a test block was taken by cutting and subjected to the same tests as in the preceding examples to give the results as follows Self extinguishment time: 8 seconds
After exposure to flame
Surface condition: rubbery elasticity retained
Cracks: none
Carbonized layer: 5 mm
Smoke emission: 66%
Curing time after storage: 2 minutes (unchanged after 7 days).

What is claimed is:

1. A foamable organopolysiloxane composition capable of being converted into a cured foamed silicone rubber which comprises:
   (a) 100 parts by weight of a first diorganopolysiloxane having a hydroxy group bonded to the silicon atom at each of the molecular chain ends and represented by the general formula $HO-SiR_2-O-SiR_2-O_mSiR_2-OH,$ in which R is a monovalent hydrocarbon group free from aliphatic unsaturation and m is a positive integer in the range from 5 to 10,000;
   (b) from 10 to 100 parts by weight of a second diorganopolysiloxane having a vinyl group bonded to the silicon atom at each of the molecular chain ends and represented by the general formula $CH_2=CH-SiR_2-O-SiR_2-O_nSiR_2-CH=CH_2,$ in which R has the same meaning as defined above and n is a positive integer in the range from 10 to 1000;
   (c) an organohydrogenpolysiloxane having, in a molecule, at least two hydrogen atoms directly bonded to the silicon atoms in such an amount that from 2.0 to 40.0 moles of the silicon-bonded hydrogen atoms are provided per mole of the overall amount of the hydroxy groups in the first diorganopolysiloxane and the vinyl groups in the second diorganopolysiloxane;
   (d) from 5 to 100 parts by weight of an inorganic filler;
   (e) a platinum compound in a catalytic amount;
   (f) from 5 to 100 parts by weight of aluminum hydroxide; and
   (g) from 0.1 to 5 parts by weight of red phosphorus.

2. The foamable organopolysiloxane composition as claimed in claim 1 wherein the monovalent hydrocarbon group free from aliphatic unsaturation denoted by R is a methyl group or a phenyl group.

3. The foamable organopolysiloxane composition as claimed in claim 1 wherein the platinum compound is chloroplatinic acid.

4. The foamable organopolysiloxane composition as claimed in claim 1 wherein the amount of the platinum compound is in the range from 1 to 200 ppm by weight based on the overall amount of the components (a), (b) and (c).

5. The foamable organopolysiloxane composition as claimed in claim 1 which further comprises an acetylene alcohol.

6. A method for the preparation of a cured foamed silicone rubber body which comprises uniformly blending: (a) 100 parts by weight of a first diorganopolysiloxane having a hydroxy group bonded to the silicon atom at each of the molecular chain ends and represented by the general formula $HO-SiR_2-O-SiR_2-O_mSiR_2-OH,$ in which R is a monovalent hydrocarbon group free from aliphatic unsaturation and m is a positive integer in the range from 5 to 10,000;

from 10 to 100 parts by weight of a second diorganopolysiloxane having a vinyl group bonded to the silicon atom at each of the molecular chain ends and represented by the general formula $$CH_2=CH-SiR_2-O-SiR_2-O_nSiR_2-CH=CH_2,$$

in which R has the same meaning as defined above and n is a positive integer in the range from 10 to 1000;

(c) an organohydrogenpolysiloxane having, in a molecule, at least two hydrogen atoms directly bonded to the silicon atoms in such an amount that from 2.0 to 40.0 moles of the silicon-bonded hydrogen atoms are provided per mole of the overall amount of the hydroxy groups in the first diorganopolysiloxane and the vinyl groups in the second diorganopolysiloxane;

(d) from 5 to 100 parts by weight of an inorganic filler;

(e) a platinum compound in a catalytic amount;

(f) from 5 to 100 parts by weight of aluminum hydroxide; and (g) from 0.1 to 5 parts by weight of red phosphorus.

7. The method for the preparation of a cured foamed silicone rubber body as claimed in claim 6 wherein the components (a) to (g) before blending are stored in two packages and the component (c) and the component (e) are contained in different packages each from the other.

8. The method for the preparation of a cured foamed silicone rubber body as claimed in claim 7 wherein one of the two packages contains the components (a), (d), (e), (f) and (g) and the other of the two packages contains the components (b), (c), (d), (f) and (g).

9. A cured foamed silicone rubber body which is a product produced by curing and foaming a foamable organopolysiloxane composition capable of being converted into a cured foamed silicone rubber which comprises:

(a) 100 parts by weight of a first diorganopolysiloxane having a hydroxy group bonded to the silicon atom at each of the molecular chain ends and represented by the general formula $$HO-SiR_2-O-SiR_2-O_mSiR_2-OH,$$

in which R is a monovalent hydrocarbon group free from aliphatic unsaturation and m is a positive integer in the range from 5 to 10,000;

(b) from 10 to 100 parts by weight of a second diorganopolysiloxane having a vinyl group bonded to the silicon atom at each of the molecular chain ends and represented by the general formula $$CH_2=CH-SiR_2-O-SiR_2-O_nSiR_2-CH=CH_2,$$

in which R has the same meaning as defined above and n is a positive integer in the range from 10 to 1000;

(c) an organohydrogenpolysiloxane having, in a molecule, at least two hydrogen atoms directly bonded to the silicon atoms in such an amount that from 2.0 to 40.0 moles of the silicon-bonded hydrogen atoms are provided per mole of the overall amount of the hydroxy groups in the first diorganopolysiloxane and the vinyl groups in the second diorganopolysiloxane;

(d) from 5 to 100 parts by weight of an inorganic filler;

(e) a platinum compound in a catalytic amount;

(f) from 5 to 100 parts by weight of aluminum hydroxide; and (g) from 0.1 to 5 parts by weight of red phosphorus.

* * * * *